United States Patent
Zuberec et al.

(10) Patent No.: US 6,606,082 B1
(45) Date of Patent: Aug. 12, 2003

(54) NAVIGATION GRAPHICAL INTERFACE FOR SMALL SCREEN DEVICES

(75) Inventors: Sarah E. Zuberec, Seattle, WA (US); Cynthia DuVal, Shoreline, WA (US); Benjamin N. Rabelos, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/191,046

(22) Filed: Nov. 12, 1998

(51) Int. Cl.⁷ .................................................. G09G 5/00
(52) U.S. Cl. ...................... 345/156; 345/157; 345/160; 345/173
(58) Field of Search ................................ 345/156, 160, 345/157, 168, 169, 173; 340/990, 995

(56) References Cited

U.S. PATENT DOCUMENTS

| | | | |
|---|---|---|---|
| 3,979,057 A | * 9/1976 | Katz et al. | 708/130 |
| 4,786,895 A | * 11/1988 | Castaneda | 345/160 |
| 4,977,509 A | * 12/1990 | Pitchford et al. | 701/207 |
| 5,021,976 A | * 6/1991 | Wexelblat et al. | 345/853 |
| 5,270,936 A | * 12/1993 | Fukushima et al. | 701/213 |
| 5,416,478 A | * 5/1995 | Morinaga | 340/995 |
| 5,568,603 A | * 10/1996 | Chen et al. | 345/784 |
| 5,589,892 A | * 12/1996 | Knee et al. | 348/731 |
| 5,590,831 A | * 1/1997 | Manson et al. | 236/51 |
| 5,602,596 A | * 2/1997 | Claussen et al. | 725/37 |
| 5,621,456 A | * 4/1997 | Florin et al. | 348/7 |
| 5,721,850 A | * 2/1998 | Farry et al. | 395/346 |
| 5,757,359 A | * 5/1998 | Morimoto et al. | 345/156 |
| 5,794,164 A | * 8/1998 | Beckert et al. | 701/1 |
| 5,801,953 A | * 9/1998 | Thoma et al. | 702/68 |
| 5,844,560 A | * 12/1998 | Crutcher et al. | 345/354 |
| 5,929,857 A | * 7/1999 | Dinallo et al. | 345/354 |
| 5,952,995 A | * 9/1999 | Barnes | 345/157 |
| 6,031,471 A | * 2/2000 | Wilson | 341/22 |
| 6,037,937 A | * 3/2000 | Beaton et al. | 345/339 |
| 6,040,829 A | * 3/2000 | Croy et al. | 345/327 |
| 6,124,826 A | * 9/2000 | Garthwaite et al. | 342/357.09 |
| 6,154,214 A | * 11/2000 | Uyehara et al. | 345/358 |
| 6,181,316 B1 | * 1/2001 | Little et al. | 345/123 |
| 6,226,512 B1 | * 5/2001 | Macaulay et al. | 455/414 |
| 6,232,973 B1 | * 5/2001 | Dow et al. | 345/352 |
| 6,259,432 B1 | * 7/2001 | Yamada et al. | 345/159 |

* cited by examiner

*Primary Examiner*—Steven Saras
*Assistant Examiner*—Fritz Alphonse
(74) *Attorney, Agent, or Firm*—Lee & Hayes, PLLC (57) ABSTRACT

An electronic device has a small-area screen to display items from a navigatable set of items and an input mechanisms (e.g., keys, joystick, spin dial, etc.) that enable a user to navigate through the navigatable items. An operator interface includes a navigation glyph having multiple elements that correspond to actions of the input mechanism. Different sets of the navigation glyph elements are illuminated to indicate which user-actions on the input mechanism are presently available to navigate from a current location to another location in the navigatable set of items.

13 Claims, 6 Drawing Sheets

NAVIGATION GRAPHICAL INTERFACE FOR SMALL SCREEN DEVICES

TECHNICAL FIELD

This invention relates to electronic devices with limited size displays, such as single array bit-mapped graphical display panels, and to operator interfaces used in such devices. More particularly, the invention relates to a dynamically changing glyph that displays the hardware control options available from any given screen of the graphical user interface.

BACKGROUND

Small screen displays are disadvantaged by their size in that it is not possible to display all necessary information (i.e. menus, menu options, data, etc.) on the screen at a time. Many features that we take for granted on large color displays cannot be displayed on screens with limited viewing areas such as those used in pagers, portable information devices, palm tops, hand held computers, automobile computers, cellular phones, and so forth.

One area particularly affected by small viewing areas is software navigation. Large displays leverage their large viewing areas to display navigation tools. Traditional navigation cues and design elements—such as listing options in a menu, arraying selectable icons within a two-dimensional space, or providing scroll bars to scroll textual documents—have evolved in the context of larger computer monitors and are effective at soliciting understandable and familiar navigation responses from the user.

These traditional navigation controls and design elements are not as useful when designing for small screens. A small screen that displays only one, two, or a few lines at a time cannot afford graphical luxuries such as scroll bars and menu lists.

A side from screen considerations, hardware navigation controls in many electronic devices are not directly associated with the software interface. While users are able to navigate through an interface, there are no visual elements in the interface to indicate which hardware controls are presently available to operate on the content material. For instance, there are no visual elements that tie in the cursor position to the cursor keys. Scroll bars might help navigate a page, but are not directly related to the content on the page, the structure, or position displayed of the document; in short, the scroll bars do not provide any indication of how to actually navigate the content of the document.

In simple pager interfaces, up and down indicators are used in the software interface to show that there is more content in the list, but they do not indicate that actions can be performed on the data (e.g., how to navigate deeper into a hierarchy or discover and set value options on particular screens). In these systems, users are forced to "try out" a hardware control to see if it carries out their desired goal. These inappropriate key presses can cause confusion and lead the user to a place in the interface where they don't want to be and don't understand and can contribute to a sense of being lost in the interface.

With these factors in mind, the inventors have sought to design a navigational interface that is effective for electronic devices with small screen areas and, associates on screen navigation tools with hardware controls. Moreover, the inventors sought to design a navigational interface that imparts an integrated hardware/software navigation cue to a user who merely glances at the interface.

SUMMARY

This invention concerns an operator interface for electronic devices with small-area screens that are typically incapable of displaying whole sets of navigatable items. Such electronic devices have input mechanisms (e.g., keys, joystick, spin dial, etc.) that enable users to navigate through the navigatable items.

The operator interface includes a navigation glyph having multiple elements that correspond to the input mechanism. The navigation glyph illuminates different sets of the elements to indicate which user-actions on the input mechanism are presently available to navigate from a current location to another location in the set of navigatable items.

In one implementation, the input mechanism includes five hardware keys for up, down, left, right, and enter. The navigation glyph has five different elements corresponding to the five hardware keys. Different colors are used to distinguish between the directional elements and the enter element.

Illumination of selected elements in the navigation glyph dictate what activity can be taken with the corresponding hardware keys. For instance, at one location in a list, the glyph might only consist of the up, down, and enter elements to represent that the user can depress the up, down or enter key to invoke a proper navigation response. The user is free to press the right or left key, but such action will not invoke a response. When the bottom of a list is reached, the glyph might only consist of the up and enter elements to represent that only depression of the up or enter key provide proper navigational input.

DETAILED DESCRIPTION

This invention is generally directed to electronic devices that have small-area screens and employ hardware buttons, keys or other input mechanisms to facilitate user input when navigating through content displayed on the screens. More particularly, the invention, concerns an operator interface with a navigation glyph that indicates which hardware activities are presently available for navigation. Activity is indicated by presence, absence or dimming of a corresponding element in the glyph.

There are many diverse devices that might implement the operator interface, including handheld information devices, pages, cellular phones, and other information appliances. For discussion purposes, two representative devices are illustrated and described: a pager and a vehicle computer system. These two devices are described separately below in conjunction with FIGS. 1–2 (pager) and FIGS. 3–4 (vehicle computer).

Figure 1:
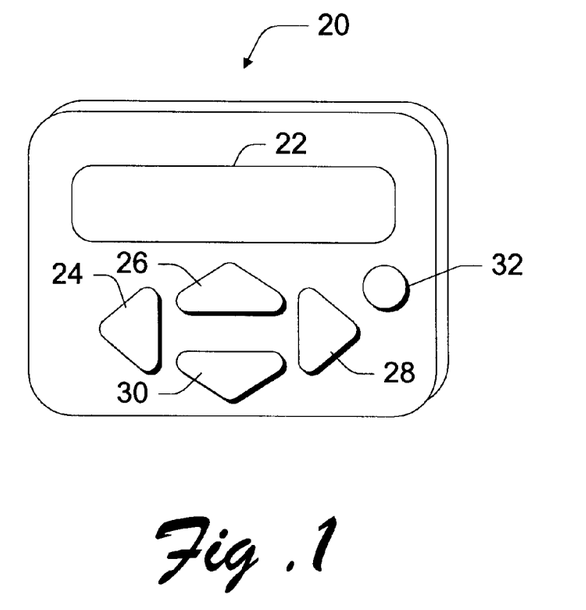
FIG. 1 is a perspective view of a portable handheld device in the form of a pager.

FIG. 1 shows a small size electronic device embodied as a pager 20. It includes a small-area screen 22, which is implemented as a bit-mapped display capable of displaying approximately one or two lines of alphanumeric characters. As an example, a pager screen might provide a resolution of 120×64 pixels. In the illustrated implementation, the pager 20 has four directional keys: a left key 24, an up key 26, a right key 28, and a down key 30. The pager also has one enter key 32. Some pagers also have a back/escape button, although this is not shown. Although individual keys are shown, other types of input mechanisms may be use, such as joysticks, a multi-direction actuation pad, a spin dial, and so forth.

Figure 2:
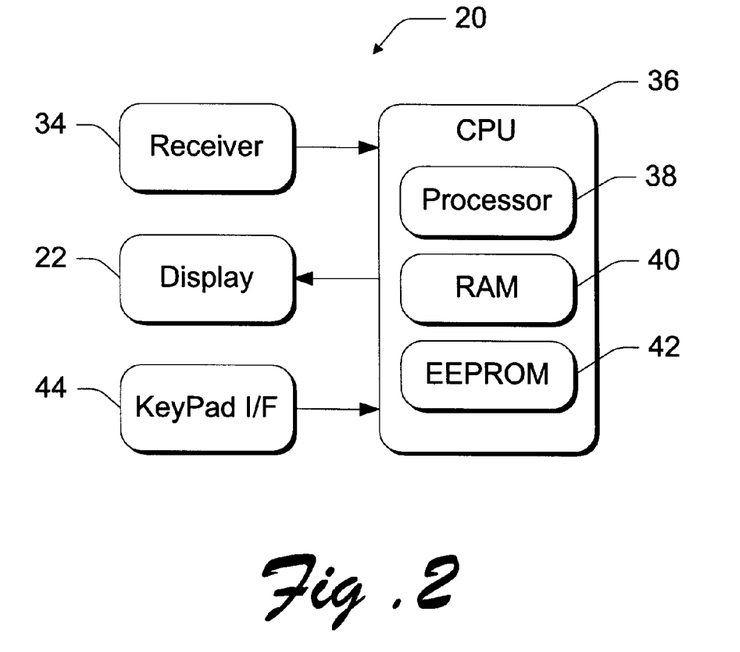
FIG. 2 is a block diagram of the pager of FIG. 1.

FIG. 2 is a simplified block diagram showing components in the pager 20. It includes a receiver 34 to receive data via a wireless communication link (e.g., RF communication). The pager 20 further includes a CPU 36 that is programmed or hardwired to perform selected tasks, such as scrolling through pages or other items. In the illustrated example, the CPU 36 includes a processor 38, RAM 40, and EEPROM 42. Program code is embedded in EEPROM 42. The CPU 36 receives transmitted data from the receiver 34 and user input from a keypad interface 44. The CPU 36 processes the data and user input and displays any results on display 22.

Figure 3:
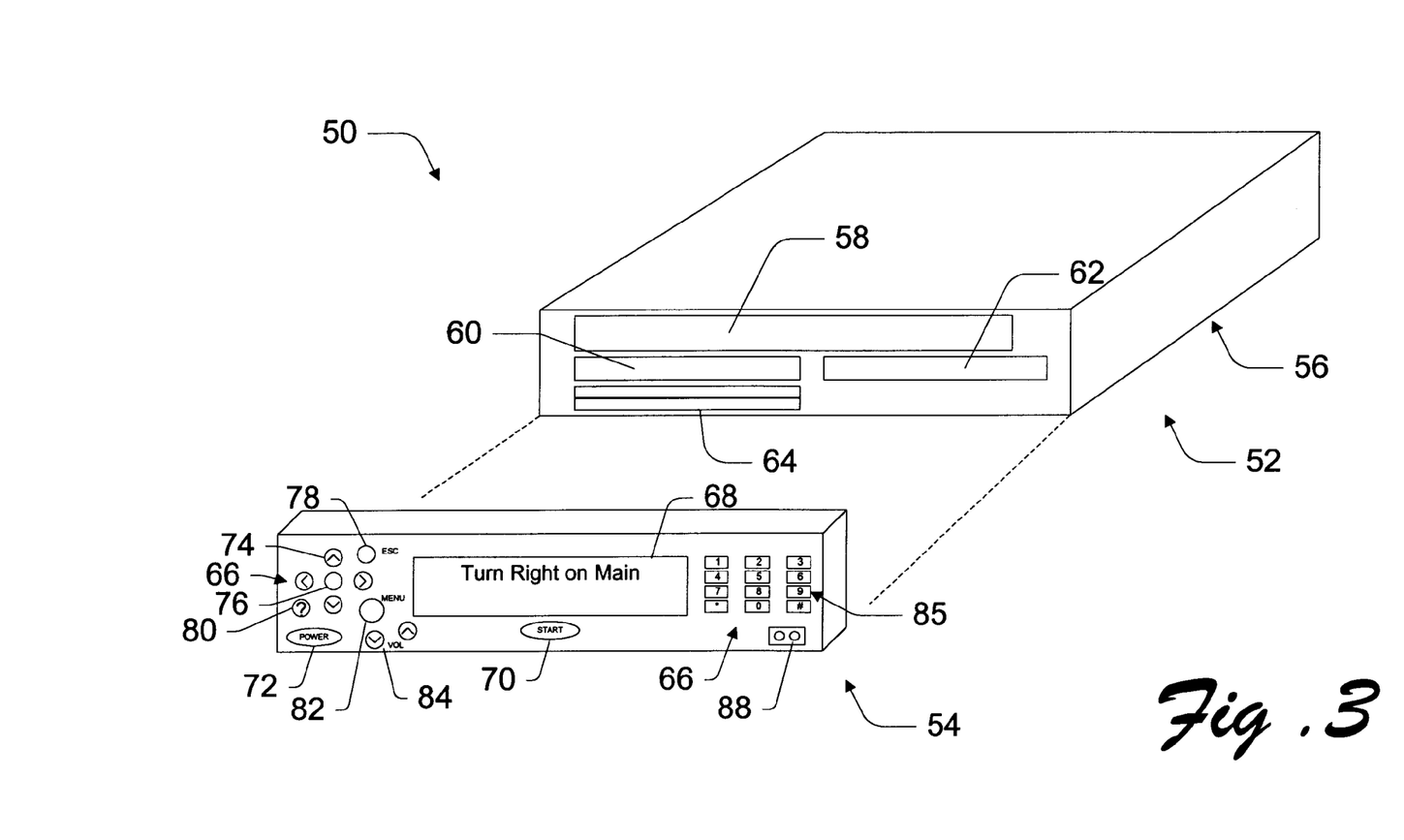
FIG. 3 is a perspective view of an in-dash vehicle computer system.

FIG. 3 shows a vehicle system 50, which is implemented as an in-dash computer accessory that supports an open platform operating system and multiple peripherals. In other embodiments, the system might be a car radio, cassette player, CD player, or similar device with more extensive operator controls than are usually available in traditional accessories of these types.

Vehicle computer system 50 has a base module 52 and a detachable faceplate 54. Base module 52 includes a housing 56, which is sized to be mounted in a vehicle dashboard similar to a conventional car stereo. Preferably, housing 56 has a form factor of a single DIN (Deutsche Industry Normen). The base module could alternatively be housed in a 2 DIN unit or other special form factor for an OEM.

Base module 52 is a computer that runs a multi-tasking operating system to support multiple applications. One preferred operating system is a Windows brand operating system sold by Microsoft Corporation, such as Windows 95, Windows CE, Windows NT or other derivative versions of the Windows family of operating systems. The computer and operating system are configured to support after-market peripherals including both hardware and software components. Applications supported by the operating system include audio entertainment applications, navigational applications, and system utility applications such as the well-known "control panel" application common in Windows operating systems. The automotive accessory also includes a speech recognition system that facilitates voice activation of various features, allowing the driver to verbally enter commands in a hands-free, eyes-free environment. A user can install after-market applications after purchase of vehicle computer 50.

The operating system exposes various application programming interfaces (APIs) as is common in Windows operating systems. Such APIs can be called and used by application programs.

The computer module 52 includes at least one storage drive that permits a user to download application programs and data from a storage medium. In the illustrated implementation, the computer 52 has a CD ROM drive 58 that reads application-related CDs, as well as musical, video, game, or other types of entertainment CDs. In this manner, the CD ROM drive 58 performs a dual role of storage drive and entertainment player. Also, a hard disk drive (not shown in FIG. 1) is included on the computer module 52. The hard disk drive can be used for storing both application programs and user data. The computer base module 52 has an optional 3.5" floppy diskette drive 60, a smart card reader 62, and dual PCMCIA card sockets 64 which accept PC (or PCMCIA) card types II and III. The faceplate 54 can be rotated to expose and permit easy access to the storage drives. In other implementations, the faceplate 54 has slots to permit access to one or more of the memory drives.

Faceplate 54 functions as an operator interface, having a keypad 66 and a graphical display 68. The faceplate is mountable for viewing by a vehicle operator. The display 68 is preferably a backlit LCD panel having a rectangular array of pixels that are individually selectable for illumination or display. The LCD panel is preferably a medium-resolution, bit-mapped display system having at least 10,000 pixels. In the described implementation, the array of pixels has a size of at least 256×64 pixels, which is quite limited in comparison to most desktop displays. The operating system of base module 52 interacts with faceplate keypad 66 and faceplate display 68 as peripheral devices when the faceplate 54 is attached to the base module 52.

The faceplate 54 has a start button or key 70 that provides the familiar "Start" functions of a Windows brand operating system, in addition to other functions that will be described below. The faceplate 54 also has a power button or key 72, four directional navigation keys or direction keys 74 (including vertical and horizontal arrow keys), an "enter" button or item selection key 76, an "escape" button or key 78, a "help" button or key 80, a "menu" button or key 82, a volume control input 84, and a plurality of number keys 85.

Vehicle computer 50 also supports an IrDA (infrared developers association) transceiver port 88 mounted on the faceplate 54 to transmit and receive data and programs using infrared signals.

Vehicle computer system 50 may support a number of components and features that are not discussed herein. For more detail regarding such features refer to a U.S. Pat. No. 5,794,164, entitled "Vehicle Computer System", which was issued Aug. 11, 1998 and is assigned to Microsoft Corporation. This application is hereby incorporated by reference.

Figure 4:
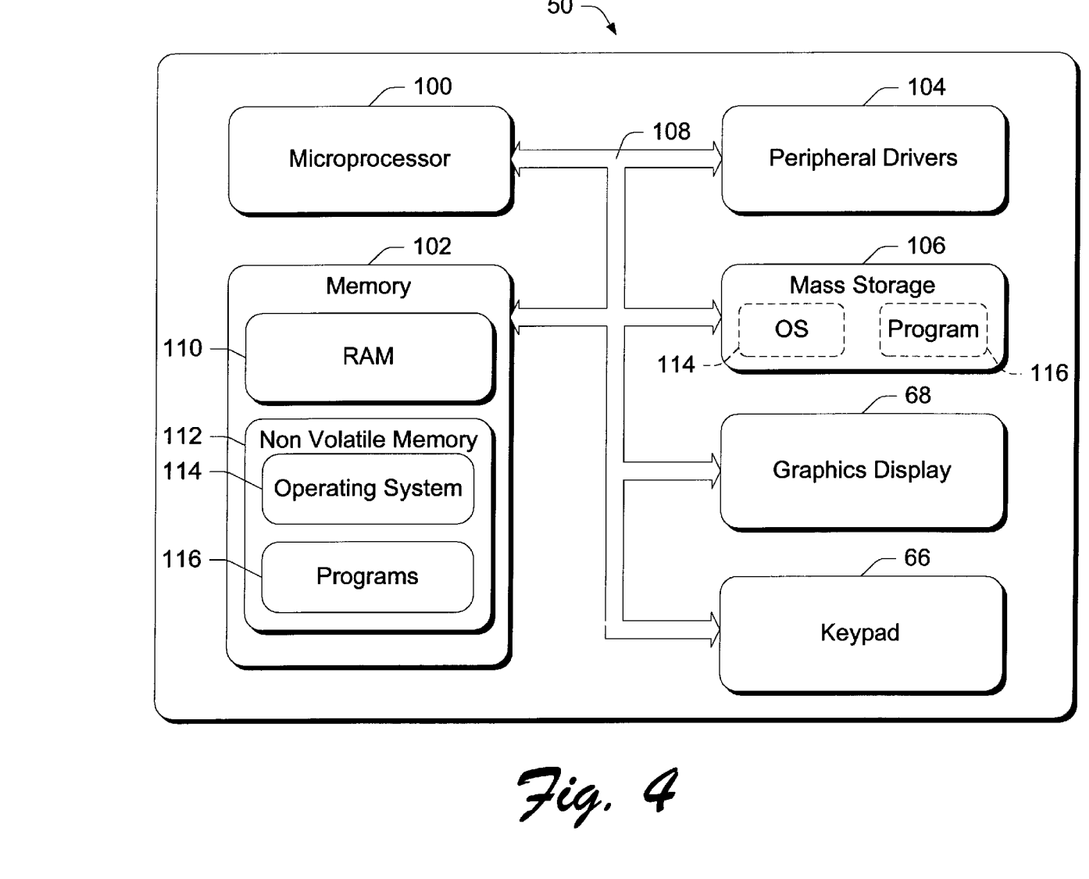
FIG. 4 is a block diagram of the vehicle computer system of FIG. 3.

FIG. 4 is a simplified block diagram showing pertinent components of vehicle computer system 50. The system 50 has a conventional computer architecture, including a microprocessor 100, associated addressable memory 102, 14 peripheral drivers 104, and optional mass storage 106. In addition, system 50 includes keypad 66 and a graphics display 68. The various components communicate internally through a parallel data bus 108. The addressable memory 102 is shown to include high-speed volatile memory 110 and non-volatile memory 112. An operating system 114 and one or more programs 116 are stored in memory 112 and execute on the microprocessor 100. Alternatively, the operating system and programs can be stored in mass storage 106 (as represented by the dashed boxes). Other components, not shown, provide different types of entertainment functionality as described in the patent cited above.

The data processor 100 is programmed by means of instructions stored at different times in the various computer-readable storage media of the device. Programs are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps and features described below in conjunction with a microprocessor or other data processor. The invention also includes the computer and other devices themselves when programmed according to the methods and techniques described below.

Vehicle computer system 50 can be used to integrate multiple vehicle-related systems onto one open platform. For instance, the system can serve as a multimedia entertainment system, a navigation system, a communications system, a security system, and a diagnostics system. Moreover, the system provides additional functionality traditionally associated with desktop and laptop personal computers. For instance, with the additional of a peripheral display device it can support word processing applications, spreadsheet applications, database applications, and appointment/schedule applications. Furthermore, the vehicle computer system 50 can be configured to operate as a server to other computing units in a vehicle to distribute games, video movies, and the like to passengers.

Figure 5:
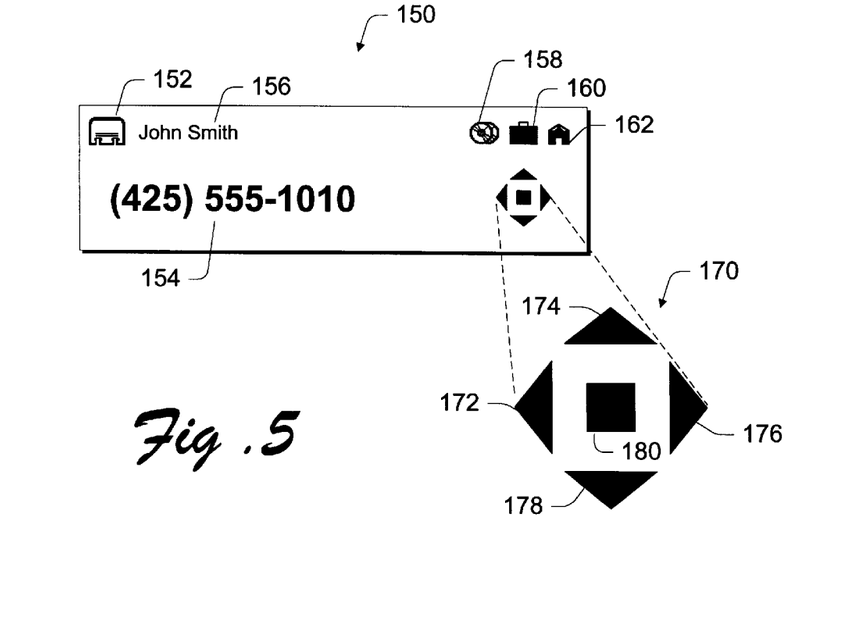
FIG. 5 is an illustration of an operator interface having a navigation glyph to assist with navigation.

FIG. 5 shows a high-level visual operator interface 150 that is displayed on the vehicle computer screen 68 (FIG. 3). It is noted that a similar interface may be displayed on the pager screen 22 (FIG. 1), but perhaps with less information due to the slightly smaller screen size.

In this exemplary illustration, the operator interface 150 exposes an address book application, as indicated by the address card icon 152. The address book application organizes and maintains personal information (e.g., address, telephone number, fax number, email address, etc.). Here, the operator interface 150 shows a telephone number 154 for a "John Smith" 156. Icons 158–162 represent different views of the address book data (i.e., the house and briefcase icons indicate home and work information), as well as other applications (i.e., the CD represents a control tool to start the CD player.

The operator interface 150 includes a navigation glyph 170 at one end of the screen to assist the user with navigating the interface. The navigation glyph 170 comprises five visual elements: a left element 172, an up element 174, a right element 176, a down element 178, and an enter element 180. The visual elements 172–180 correspond to the left, up, right, down,-and enter hardware keys 66 of the vehicle computer 50. The particular configuration of the five individual elements changes dynamically as opportunities for their use change during interface navigation.

In one exemplary implementation, the four direction elements 172–178 are represented by yellow carets and the enter element 180 is represented by a green dot. The colors are chosen for maximum visibility on a black background. When active, the individual elements appear in the same relative position in the cluster at the right side of the operator interface 150. While any hardware key in keypad 66 can be pressed at any time, the navigation glyph 170 only illuminates the elements representing corresponding keys that the user can expect to invoke a navigation response.

Figure 6:
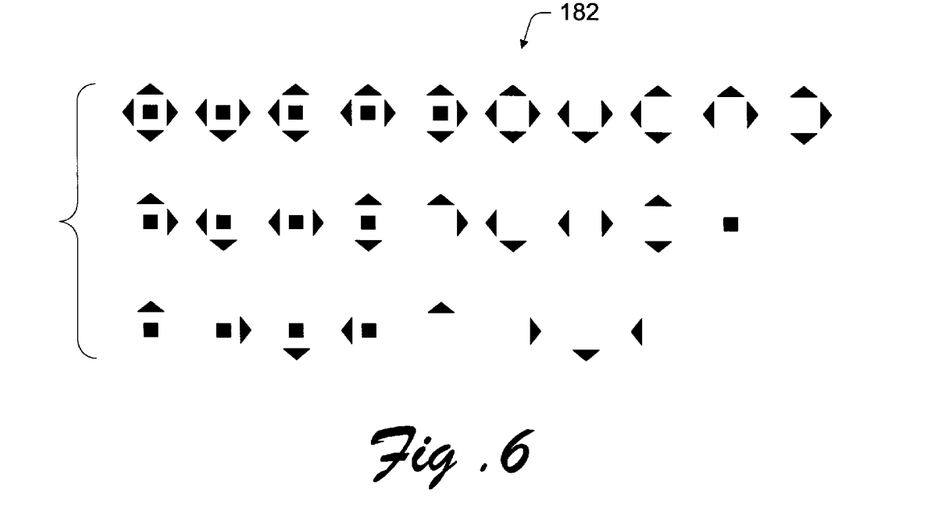
FIG. 6 illustrates different permutations of the navigation glyph.

FIG. 6 shows a universe 182 of different sets of elements in the navigation glyph 170 that can be illuminated at any one time. There are 28 different sets in universe 182, with each set offering a different group of operations that can be executed by user-input on the keypad. As the user navigates through a menu or list, different element sets of the glyph are illuminated.

The navigation glyph is particularly useful for navigating a multi-lined list in which, due to screen size, only one item in the list can be presented at a time. The navigation glyph 170 provides an "at-a-glance" indication that more items exist in the list (in addition to the one they are viewing) as well as an indication of which hardware keys are available to navigate the list and perform actions on the items.

Although not shown, the navigation glyph might also include an element representing a back/escape function offered by the hardware buttons for navigation.

Figure 7:
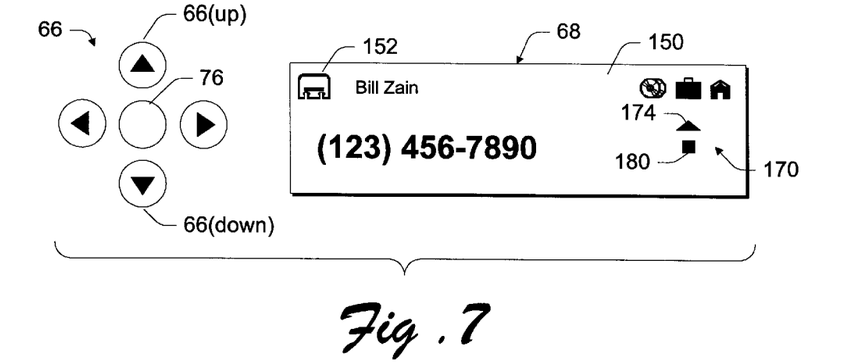
FIGS. 7–9 are illustrations of the navigation glyph during operation.
Figure 8:
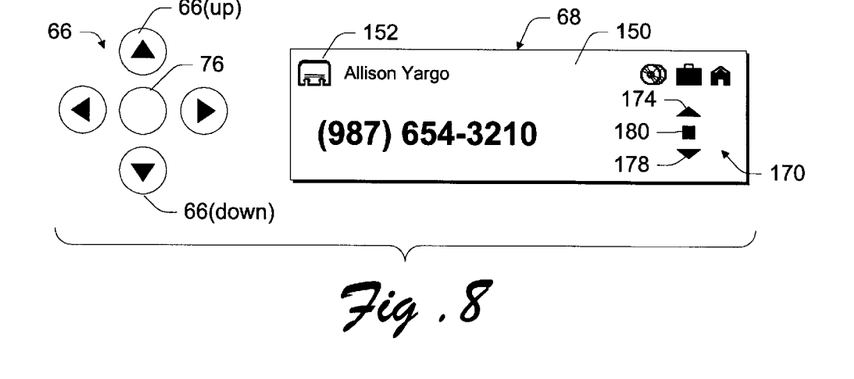

FIGS. 7 and 8 show one example illustrating the operation and usefulness of the navigation glyph 70 in navigating a set of navigatable items. In these figures, the computer keypad 66 is shown beside the screen 68, in the same relation shown in FIG. 3, to illustrate the correspondence between the hardware keys and the glyph elements.

In FIG. 7, the operator interface 150 exposes the address book application, as indicated by the address card icon 152. The application has reached the bottom of the list, as represented by the last name "Bill Zain". At this point, the navigation glyph 170 illuminates only the yellow up element 174 and the green enter element 180. The yellow up element 174 indicates that there is another item available in the list in the up or previous direction. The up element 174 of the navigation glyph corresponds to the up key 66(up) in keypad 66. This informs the user "at-a-glance" that depression of the up key 66(up) will list the previous item in the list.

The green enter element 180 corresponds to enter key 76 and indicates, that the item can be selected. That is, the user can depress enter key 76 to have the address book application pull up more information on "Bill Zain".

When an event occurs to change navigational opportunities, a different configuration of glyph elements appears. Suppose, for example, that the user depresses the up key 66(up) to the previous item. This entry causes the application to cycle to a new record in the list. As a result, the navigation glyph 170 must now represent navigation opportunities from a new location in the list.

FIG. 8 shows the operator interface 150 after selection the up key 66(up) is depressed. A new record for "Allison Yargo" is found and shown. Since this is now longer the last item on the list, the navigation glyph 170 is modified to include the down element 178. The yellow down element 178 indicates that there is at least one other item available in the list in the down direction. This informs the user "at-a-glance" that depression of the down key 66(down) will list the next item in the list.

Figure 9:
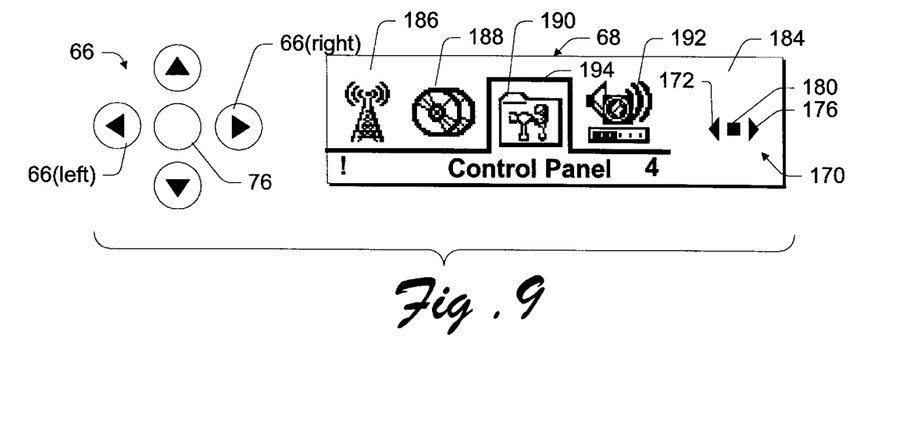

FIG. 9 shows another example of the navigation glyph 70 in navigating a horizontal start menu 184. In this case, the menu has four icons: a radio icon 186 for accessing a tuning menu to tune the radio, a CD icon 188 for playing CD music, a control panel icon 190 for accessing the control panel of the computer, and an audio control icon 192 for accessing menus pertaining to audio parameters. A highlight window 194 indicates that the focus is presently on the control panel icon 190.

At this point, the navigation glyph 170 illuminates the right and left elements 172 and 176 and the enter element 180. The yellow left and right elements indicate that depressing corresponding left and right keys 66(left) and 66(right) on keypad 66 will shift the focus 194 to a neighboring icon. Additionally, the green enter element 180 indicates that depressing enter key 76 will cause the computer to enter into a menu for the control panel.

Figure 10:
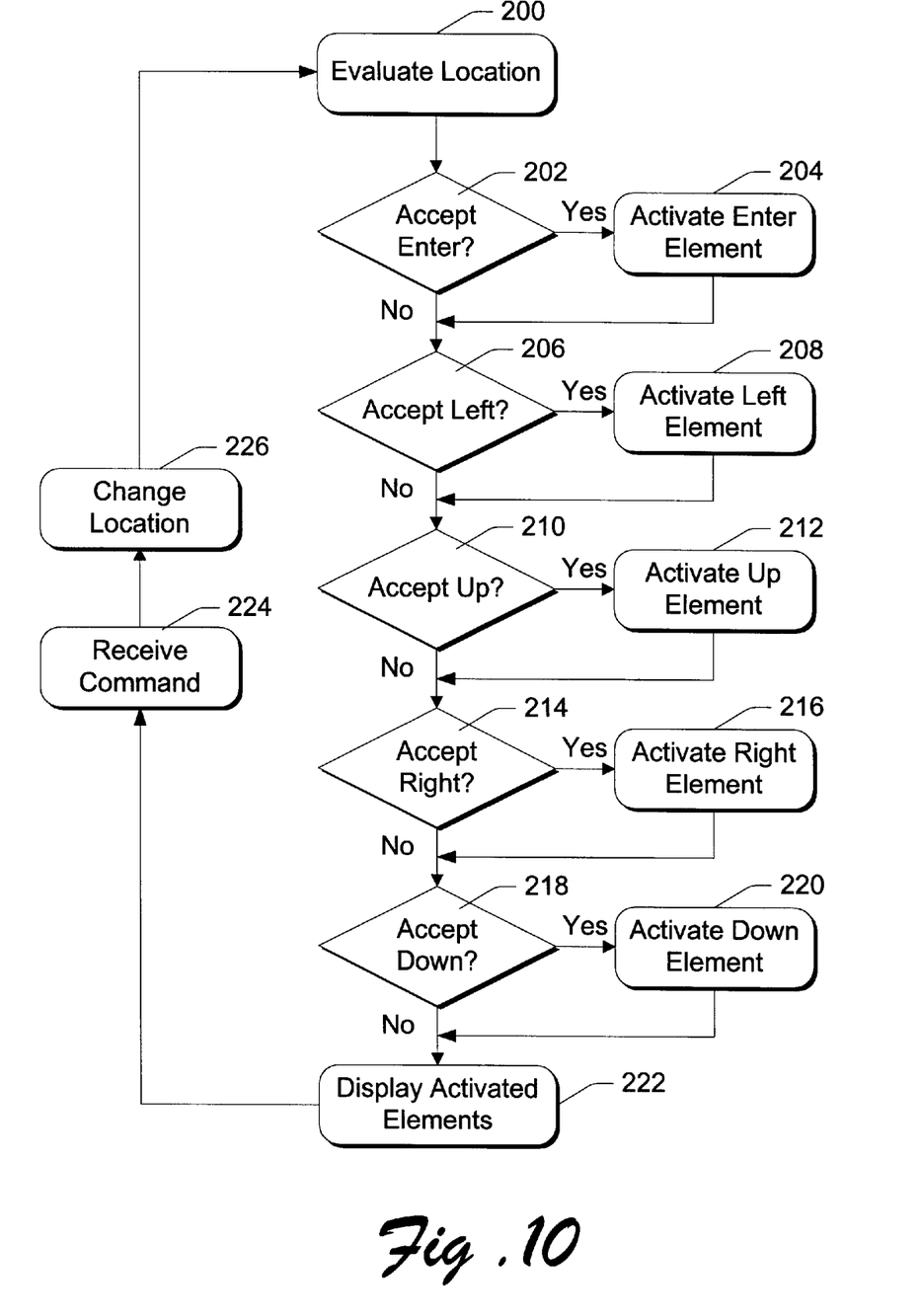
FIG. 10 is a flow diagram showing steps in a method for operating the navigation glyph.

FIG. 10 shows steps in a method for operating the navigation glyph according to one exemplary implementation. These steps are performed in software (or firmware). At step 200, the active application or utility evaluates its current location within a set of navigatable items to determine what user inputs are appropriate to continue navigation. For instance, in a list context, the active application might determine whether the item displayed on the small-area screen is at the beginning, end, or somewhere in the middle of a list. Once the present location is known, the active application or utility determines what navigation options are available given this location. Decision steps 202, 206, 210, 214, and 218 process through the different options.

At step 202, the application determines whether it will accept an enter command given the current location. If so, the enter element 180 is activated (step 204); otherwise, the enter element is left deactivated. At step 206, the application determines whether it will accept a left command. If so, the left element 172 is activated (step 208); otherwise, the left element is left deactivated.

At step 210, the application determines whether it will accept an up command. If so, the up element 174 is activated (step 212); otherwise, the up element is left deactivated. At step 214, the application determines whether it will accept a right command. If so, the right element 176 is activated (step 216); otherwise, the right element is left deactivated. Finally, at step 218, the application determines whether it will accept a down command. If so, the down element 178 is activated (step 220); otherwise, the down element is left deactivated.

At step 222, the set of activated elements is displayed as the navigation glyph for that location. The user can use the navigation glyph to learn which keys are operative at this point, and depress an appropriate key. The application receives the entered command (step 224), which causes a change in navigational location (step 226). For instance, depressing an up key in a list moves the location to the previous item in the list. Following this change of location, the application reevaluates the new location to determine the next set of available navigational options (step 200). For instance, following the user entry, the application might determine whether it has reached a navigational boundary, like the top or bottom of a list.

The navigation glyph has many benefits. One benefit is that it provides an "at-a-glance" understanding of which hardware controls map to which interface actions and facilitates "at-a-glance" understanding of what actions are available to the operator. It also reduces the number of inappropriate key presses and defines which hardware controls are active in the current state.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An electronics device, comprising:
    an input mechanism that enables a user to enter multiple different navigation commands;
    a screen comprising a display area for displaying no more than three lines of alphanumeric characters;
    a processing unit coupled to the input mechanism and the screen, the processing unit displaying on the screen a current item from a navigatable set of items and in response to navigation commands entered via the input mechanism, changing to a new item in the navigatable set; and
    a navigation glyph for presentation on the screen, the navigation glyph comprising individual elements that are selectively displayed, on the screen to indicate which of the different navigation commands are available for entry via the input mechanism to navigate from the current item to the new item, only the navigational glyph elements that are selectively displayed being presented, each selectively displayed navigation glyph element representing a respective navigation command that can be expected to presently assist in navigation through one or more of the navigatable items.

2. An electronics device as recited in claim 1, wherein the input mechanism comprises individual keys and the navigation glyph comprises individual elements that are selectively illuminated to represent which of the keys are available to navigate from the current item to the new item.

3. A vehicle computer system comprising:
    a computer;
    an open platform operating system executing on the computer, the operating system being configured to support multiple applications;
    an operator interface that is mountable for viewing by an operator, the operator interface presenting navigatable items from a hierarchical list supported by at least one of the operating system or an application, the operator interface comprising presentation area for displaying only one or two alphanumeric lines of information;
    an input mechanism to enable a user to navigate through the navigatable items on the operator interface; and
    a navigation glyph presented on the operator interface, the navigation glyph having multiple elements that correspond to actions of the input mechanism that cause navigation through the navigatable items, the navigation glyph illuminating different sets of the elements to indicate which actions of the input mechanism are presently available to navigate through the navigatable items, only illuminated navigational glyph elements being presented on the operator interface.

4. A vehicle computer as rested in claim 3, wherein the input mechanism comprises individual keys and the navigation glyph comprises individual elements that are selectively illuminated to represent which of the keys are available to navigate through the navigatable items.

5. An operator interface for an electronic device, the electronic device having an input mechanism that enables a user to enter navigation commands, comprising:
    a screen to display at least one current item from a navigatable set of items; and
    a navigation glyph presented on the screen, the navigation glyph comprising individual elements that are selectively illuminated to indicate which of the navigation commands are presently available for entry via the input mechanism to navigate from the current item on the screen to another item, only individually illuminated navigational glyph elements being presented on the operator interface.

6. An operator interface as recited in claim 5, wherein the navigation glypl comprises individual elements representing direction and entry functions provided by the input mechanism.

7. An operator interface as recited in claim 6, wherein the elements representing direction are a first color and the element representing entry is a second color different than the first color.

8. A method for operating a visual interface in an electronics device, the electronic device having an input mechanism that enables a user to enter navigation commands, comprising the following steps:

determining a current location within a navigatable set of items;

presenting a first permutation of a navigational glyph on the visual interface, the navigational glyph comprising a plurality of individual elements, the first permutation comprising a first set of selected ones of the individual elements, the first permutation representing corresponding actions of the input mechanism that cause navigation from a current location to another location in the navigatable set of items;

receiving a navigation command as a result of user actuation of the input mechanism, the.navigation command causing a change from the current location to a new location in the navigatable set of items; and presenting a second permutation of the navigational glyph on the visual interface, the second permutation comprising a second set of selected ones of the individual elements, the first set not being equivalent to the second set, the second permutation only representing corresponding actions of the input mechanism that can presently cause navigation from the new location to another location in the navigatable set of items.

9. A method as recited in claim presenting step 8, wherein the first and second permutations of the navigation glyph comprise sets of one or more elements, and the presenting step comprises the step of selectively illuminating ones of the elements.

10. A method as recited in claim presenting step 8, wherein the first and second permutations of the navigation glyph comprise sets of one or more elements, and the presenting step comprises the step of illuminating the elements in two different colors.

11. A method for operating a visual interface in an electronics device, the electronic device having an input mechanism that enables a user to enter navigation commands, comprising the following steps:

determining a current location within a navigatable set of items;

evaluating whether navigation in a left direction from the current location is possible and if so, activating a corresponding element in a navigation glyph that represents actuation of the input mechanism to cause navigation in the left direction;

evaluating whether navigation in an up direction from the current location is possible and if so, activating a corresponding element in a navigation glyph that represents actuation of the input mechanism to cause navigation in the up direction;

evaluating whether navigation in a right direction from the current location is possible and if so, activating a corresponding element in a navigation glyph that represents actuation of the input mechanism to cause navigation in the right direction;

evaluating whether navigation in a down direction from the current location is possible and if so, activating a corresponding element in a navigation glyph that represents actuation of the input mechanism to cause navigation in the down direction;

evaluating whether an enter operation can be performed from the current location and if so, activating a corresponding element in a navigation glyph that represents actuation of the input mechanism to facilitate the enter operation, the enter operation causing an action corresponding to a navigable item with focus at the current location; and displaying, with respect to the navigation glyph, only activated elements of the navigation glyph, each activated element representing a presently available navigation command, which if selected by a user will cause navigation through one or more of the navigable items.

12. A computer-readable storage medium having instructions for implementing an operator interface in an electronic device, the electronic device having an input mechanism that enables a user to enter navigation commands, the instructions being executable to perform steps comprising:

determining a current location within a navigatable set of items;

presenting a first permutation of a navigational glyph comprising a plurality of individual elements on the visual interface, the first permutation comprising a first set of selected ones of the individual elements, the first permutation representing corresponding actions of the input mechanism that cause navigation from a current location to another location in the navigatable set of items;

receiving a navigation command as a result of user actuation of the input mechanism, the navigation command causing a change from the current location to a new location in the navigatable set of items; and presenting a second permutation of the navigational glyph on the visual interface, the second permutation comprising a second set of selected ones of the individual elements, the first set not being equivalent to the second set, the second permutation only representing corresponding actions of the input mechanism that can presently cause navigation from the new location to another location in the navigatable set of items.

13. A computer-readable storage medium storing a navigation glyph and instructions for presenting permutations of the navigation glyph on an operator interface of an electronic device, the electronic device having an input mechanism that enables a user to enter navigation commands, comprising:

multiple glyph elements representing corresponding actions of the input mechanism that cause navigation through a set of navigatable items; and instructions to selectively illuminate individual ones of the glyph elements to represent which actions of the input mechanism are presently appropriate to navigation from a current location to another location within the navigatable items, only illuminated glyph elements being presented on the operator interface.

* * * * *

UNITED STATES PATENT AND TRADEMARK OFFICE
CERTIFICATE OF CORRECTION

PATENT NO. : 6,606,082 B1
DATED : August 12, 2003
INVENTOR(S) : Zuberec et al.

It is certified that error appears in the above-identified patent and that said Letters Patent is hereby corrected as shown below:

Column 8,
Line 40, replace "rested" with -- recited --.
Line 43, replace "illumainated" with -- illuminated --.
Line 59, replace "glypl" with -- glyph --.

Signed and Sealed this

Twenty-second Day of June, 2004

JON W. DUDAS
*Acting Director of the United States Patent and Trademark Office*